United States Patent
Hayashida (10) Patent No.: US 10,237,434 B2
(45) Date of Patent: Mar. 19, 2019

(54) DISPLAY CONTROL APPARATUS, DISPLAY CONTROL METHOD, AND NON-TRANSITORY COMPUTER READABLE MEDIUM FOR TEMPORARILY SUSPENDING AUTOMATIC IMAGE SWITCHING

(71) Applicant: FUJI XEROX CO., LTD., Tokyo (JP)

(72) Inventor: Toshiharu Hayashida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 55 days.

(21) Appl. No.: 15/444,849

(22) Filed: Feb. 28, 2017

(65) Prior Publication Data

US 2018/0027139 A1    Jan. 25, 2018

(30) Foreign Application Priority Data

Jul. 25, 2016  (JP) .................................. 2016-145382

(51) Int. Cl.
*G06F 3/12* (2006.01)
*H04N 1/00* (2006.01)
*H04N 1/04* (2006.01)

(52) U.S. Cl.
CPC ..... *H04N 1/00925* (2013.01); *H04N 1/00411* (2013.01); *H04N 1/00458* (2013.01); *H04N 1/00917* (2013.01); *H04N 1/04* (2013.01); *H04N 2201/0094* (2013.01)

(58) Field of Classification Search
None
See application file for complete search history.

(56) References Cited

U.S. PATENT DOCUMENTS

| 2008/0122734 | A1* | 5/2008 | Sudo | G06F 17/30056 345/1.3 |
| 2010/0312833 | A1* | 12/2010 | Rimmer | G08B 21/0415 709/204 |
| 2011/0304779 | A1* | 12/2011 | Wada | H04N 1/00424 348/739 |

FOREIGN PATENT DOCUMENTS

JP    2012-257013 A    12/2012

* cited by examiner

*Primary Examiner* — Neil R McLean
*Assistant Examiner* — Pawan Dhingra
(74) *Attorney, Agent, or Firm* — Oliff PLC (57) ABSTRACT

A display control apparatus includes an acquisition unit that successively acquires plural images, a display unit that displays the images on a display in an automatic image switching mode by successively switching from one to another the images acquired by the acquisition unit, a suspending unit that temporarily suspends the automatic image switching mode without the acquisition unit stopping acquiring the images if an instruction to suspend the automatic image switching mode is provided, and a resuming unit that resumes the automatic image switching mode that has been temporarily suspended by the suspending unit.

18 Claims, 7 Drawing Sheets

DISPLAY CONTROL APPARATUS, DISPLAY CONTROL METHOD, AND NON-TRANSITORY COMPUTER READABLE MEDIUM FOR TEMPORARILY SUSPENDING AUTOMATIC IMAGE SWITCHING

CROSS-REFERENCE TO RELATED APPLICATIONS

This application is based on and claims priority under 35 USC 119 from Japanese Patent Application No. 2016-145382 filed Jul. 25, 2016.

BACKGROUND

Technical Field

The present invention relates to a display control apparatus, a display control method, and a non-transitory computer readable medium.

SUMMARY

According to an aspect of the invention, there is provided a display control apparatus. The display control apparatus includes an acquisition unit that successively acquires plural images, a display unit that displays the images on a display in an automatic image switching mode by successively switching from one to another the images acquired by the acquisition unit, a suspending unit that temporarily suspends the automatic image switching mode without the acquisition unit stopping acquiring the images if an instruction to suspend the automatic image switching mode is provided, and a resuming unit that resumes the automatic image switching mode that has been temporarily suspended by the suspending unit.

BRIEF DESCRIPTION OF THE DRAWINGS

Exemplary embodiment of the present invention will be described in detail based on the following figures, wherein.

DETAILED DESCRIPTION

Referring to the drawings, an exemplary embodiment of the present invention is described in detail below.

Figure 1:
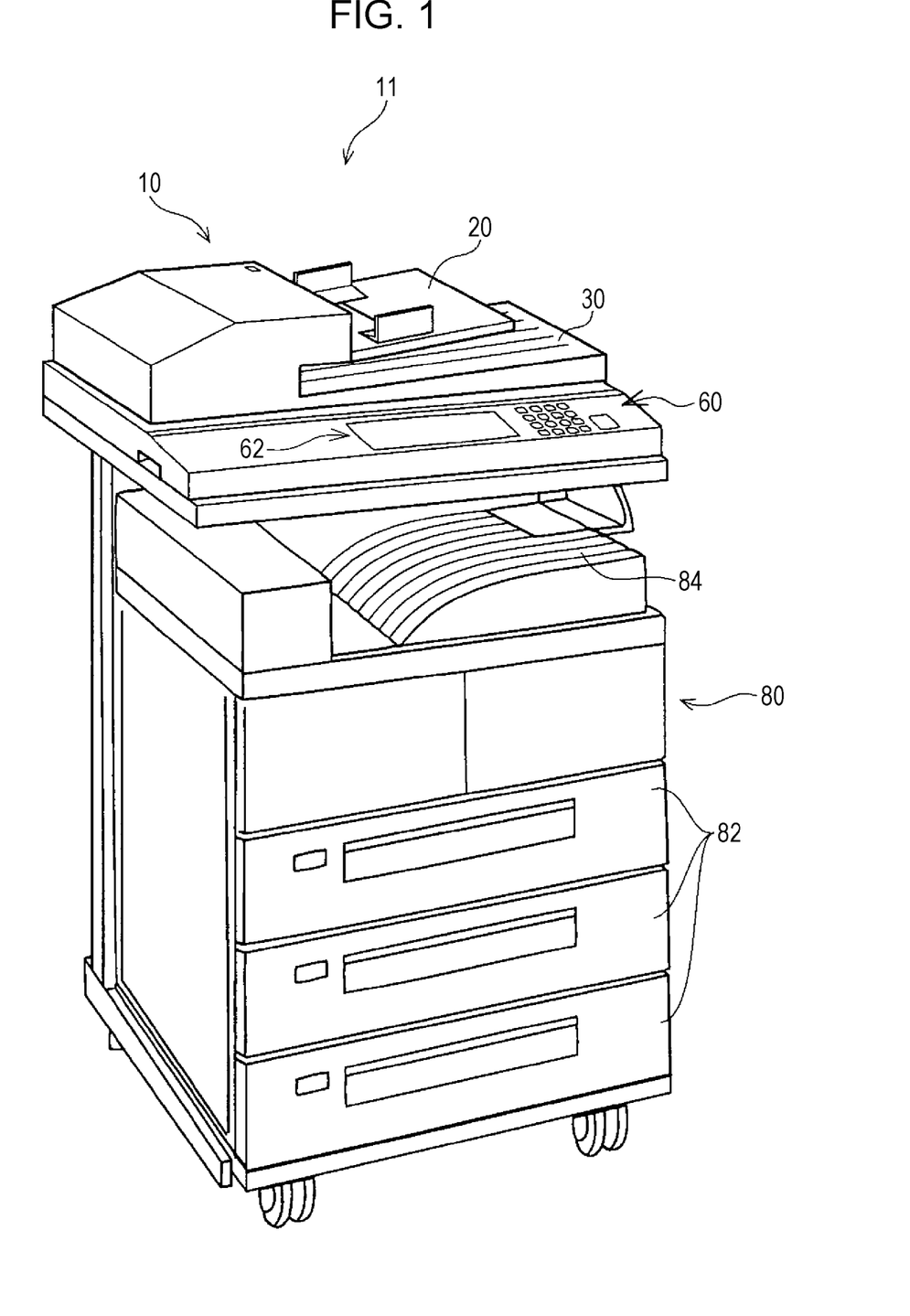
FIG. 1 is an external view of an image forming apparatus.

FIG. 1 is an external view of an image forming apparatus 11 of the exemplary embodiment. Referring to FIG. 1, the image forming apparatus 11 includes an image reading unit 10, an image forming unit 80, paper sheet feeding units 82, and a paper sheet discharging unit 84.

Figure 2:
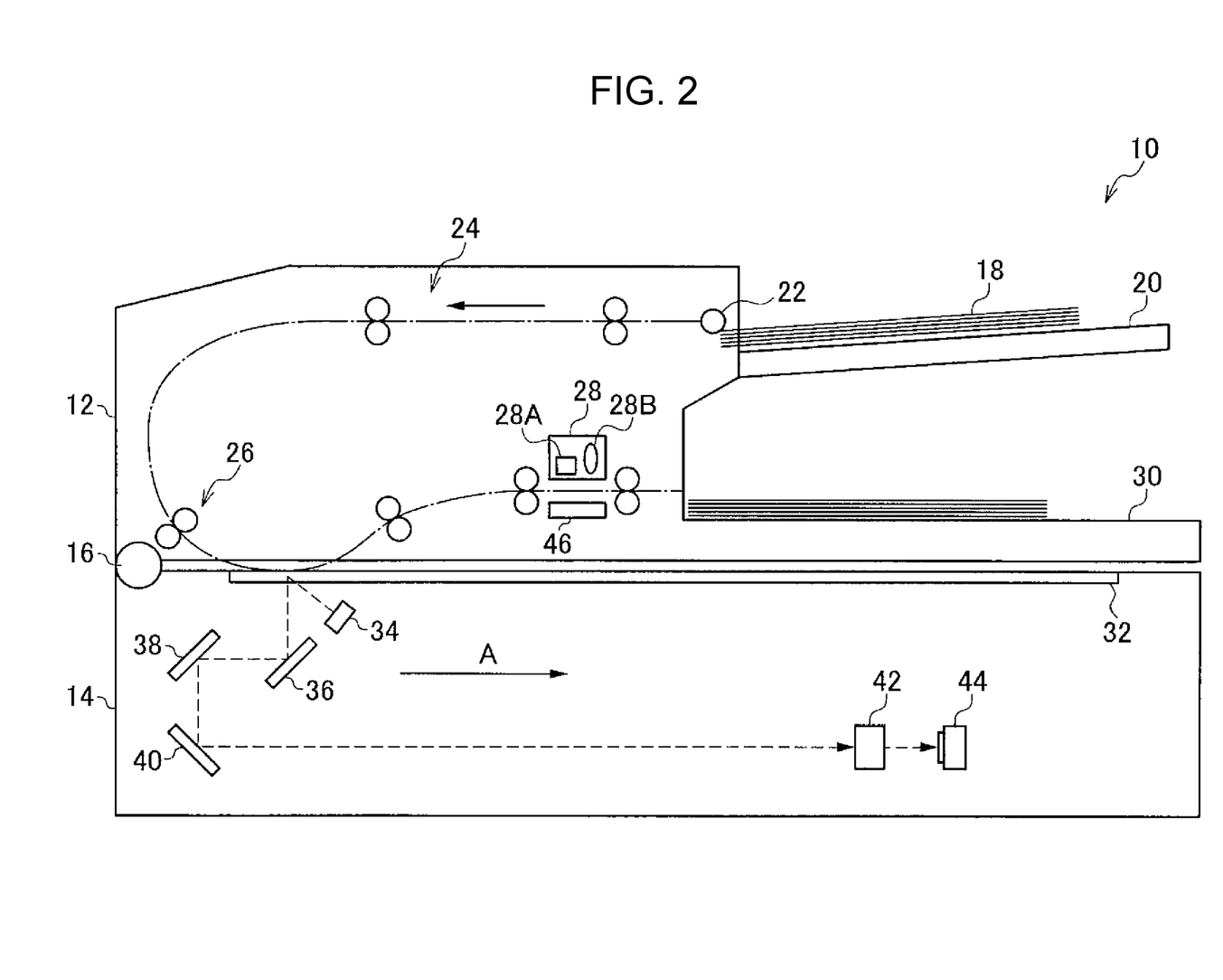
FIG. 2 illustrates an image reading unit.

As illustrated in FIG. 2, the image reading unit 10 includes a front image reader 14 and a dual auto document feeder (DADF) 12 including a rear image reader 28.

The DADF 12 includes an original document tray 20 on which an original document 18 having an original image recorded thereon is placed, a pickup roller 22 that picks up the original documents 18 one by one placed on an original document tray 20, a transport path 24 including multiple transport rollers 26, the rear image reader 28, a reference plate 46 that faces the rear image reader 28, and a discharging unit 30 that discharges the original document that has undergone image reading.

The rear image reader 28 is a fixed-type image sensor and includes a light source 28B, and a line sensor 28A. The light source 28B includes multiple light emitting elements arrayed in a first scanning direction and emitting illumination light to the original document 18 and the reference plate 46. The line sensor 28A senses light from the original document 18 and the reference plate 46 with multiple separate pixels and outputs read data responsive to a pixel value measured on a per pixel basis. The rear image reader 28 includes rod-arrayed lenses (not illustrated), and the line sensor 28A senses light reflected from the original document 18 or the reference plate 46 via the rod-arrayed lenses. The reference plate 46 serves as a reference plate that is read by the rear image reader 28 when shading correction is performed. The reference plate 46 may be a white resin plate, a white-painted metal plate, or the like.

The front image reader 14 includes a transparent platen glass 32 on which the original document 18 is placed. Arranged below the platen glass 32 are the light source 34 that emits illumination light to the surface of the original document 18, a first reflective mirror 36 that receives the light reflected from the surface of the original document 18, a second reflective mirror 38 that bends by 90° the travel path of the light reflected by the first reflective mirror, and a third reflective mirror 40 that further bends by 90° the travel path of the light reflected by the second reflective mirror 38.

The light source 34 includes a fluorescent lamp or multiple light emitting diodes (LEDs) arrayed in a direction perpendicular to the transport direction of the original document 18.

The front image reader 14 includes a lens 42, and a photoelectric converter 44 having multiple pixels. The front image reader 14 reads the surface of the original document 18 by focusing the light reflected from the third reflective mirror 40 onto the photoelectric converter 44 through the lens 42.

The photoelectric converter 44 is a solid-state imaging device, such as a charge-coupled device (CCDs) line sensor including multiple CCDs, or a complementary metal-oxide semiconductor (CMOS) sensor.

In the image reading unit 10, the original documents 18 placed on the original document tray 20 are picked up one sheet by one sheet by the pickup roller 22 and then transported to the transport path 24. The original document 18 placed onto the transport path 24 is transported to a surface reading position of the front image reader 14 by a transport roller pair 26. The surface of the original document 18 is then read by the front image reader 14. The original document 18 is transported to the rear image reader 28 that is disposed downstream of the surface reading position in the transport path. If the original document 18 is set to be duplex-read, the rear surface of the original document 18 is read by the rear image reader 28, and the original document 18 is then discharged into the discharging unit 30.

In the image reading unit 10, the light source 34, the first reflective mirror 36, the second reflective mirror 38, and the third reflective mirror 40 are arranged such that they are movable in the direction labeled by an arrow mark A as illustrated in FIG. 1. When the dual auto document feeder 12 is opened upward from the front image reader 14, and the original document 18 is placed on top of the platen glass 32, the light source 34 emits an illumination light beam to the original document 18 while the light source 34, the first reflective mirror 36, the second reflective mirror 38, and the third reflective mirror 40 are moved in the direction of the arrow mark A. The image formed on the original document 18 is thus read. The image reading unit 10 is an example of an acquisition unit or a reading unit of the exemplary embodiment of the present invention.

The image forming unit 80 prints a document image on a paper sheet through the electrophotographic system. The image forming unit 80 includes an endless intermediate transfer belt, an image forming module, and an optical module. The image forming module transfers toner images of yellow (Y), magenta (M), cyan (C), and black (K) to the intermediate transfer belt. The optical module forms an electrostatic latent image on a photoconductor drum by exposing a photoconductor drum of the image forming module to a laser light beam modulated with image information.

The image forming module includes the photoconductor drum, a charger that uniformly charges the surface of the photoconductor drum, a development section that forms a toner image with each color toner from an electrostatic latent image formed on the surface of the photoconductor drum by the optical module, and a transfer roller that presses the intermediate transfer belt against the photoconductor drum. The intermediate transfer belt is driven by a driving roller linked to a motor.

The image forming unit 80 includes a transfer module, a fixing module, and discharge rollers. The transfer modules transfer the toner images formed on the intermediate transfer belt onto a paper sheet fed by the paper sheet feeding unit 82. The fixing module fixes the toner image transferred onto the paper sheet to the paper sheet. The discharge rollers discharge to the paper sheet discharging unit 84 the paper sheet that has passed through the fixing module.

The paper sheet feeding unit 82 includes multiple paper sheet trays and multiple rollers. The paper sheet trays contain paper sheets of different types in terms of direction, size, and paper quality. The multiple rollers pick up each paper sheet from the paper sheet trays, and transfer the paper sheet to the transfer module of the image forming unit 80.

In the image forming apparatus 11 thus constructed, the image reading unit 10 reads the original document, and the image forming unit 80 forms an image on a paper sheet fed by the paper sheet feeding unit 82 in accordance with the read data.

Figure 3:
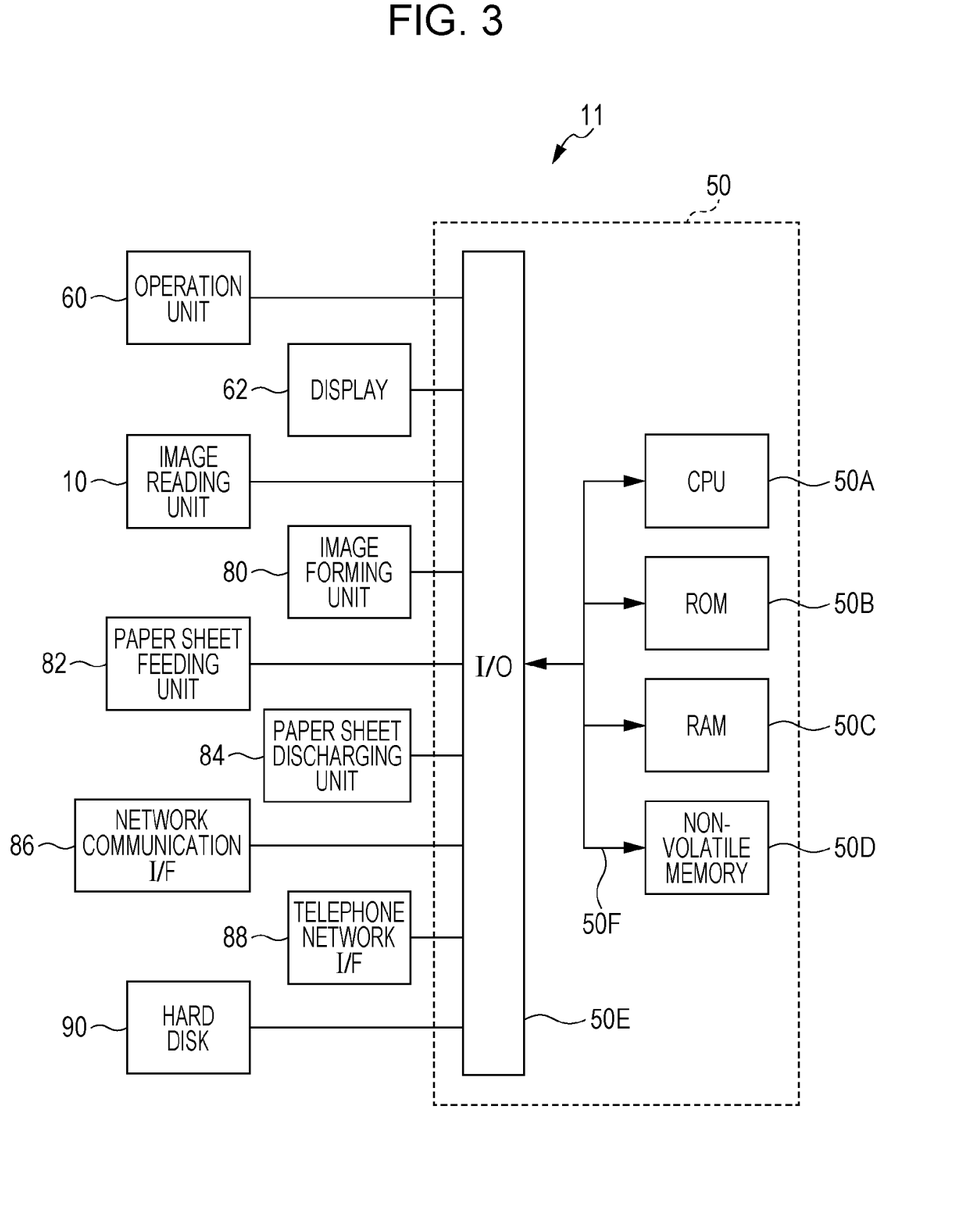
FIG. 3 is a block diagram illustrating an electrical configuration of the image forming apparatus.

FIG. 3 is a block diagram illustrating an electrical configuration of the image forming apparatus 11 of the exemplary embodiment. Referring to FIG. 3, the image forming apparatus 11 includes a computer 50.

The computer 50 includes a central processing unit (CPU) 50A, a read-only memory (ROM) 50B, a random-access memory (RAM) 50C, a non-volatile memory 50D, and an input and output (I/O) interface 50E. These elements are mutually connected by a bus 50F. Note that the CPU 50A is an example of a display unit, a suspending unit, a resuming unit, or an identifying unit.

The I/O interface 50E connects to functional elements including operation unit 60, display 62, image reading unit 10, image forming unit 80, paper sheet feeding unit 82, paper sheet discharging unit 84, network communication I/F 86, telephone network I/F 88, and hard disk 90.

The operation unit 60 includes a start button to start copying, and alphanumeric keys.

The display 62 displays a variety of screens including a configuration screen to set a variety of image forming conditions including a copy density, and a verification screen to verify a preview image. In accordance with the exemplary embodiment, the display 62 includes a touchpanel that allows a variety of operations to be performed by finger touching on a variety of screens.

The network communication I/F 86 is an interface that performs data communication with an external apparatus via a network.

The telephone network I/F 88 is an interface that performs facsimile communication with another image forming apparatus connected thereto via a telephone network (not illustrated).

The hard disk 90 stores log data concerning the state of and operational status of each element of the image forming apparatus 11, log data concerning process results of copying, the facsimile communication, and printing, a variety of configuration data, and a display control program to be discussed below.

When an instruction to set and read multiple original document sheets on the original document tray 20, the image forming apparatus 11 of the exemplary embodiment generates each preview image from each of the images of the original documents successively read by the image reading unit 10, and automatically scrolls the preview images on the display 62 (in an automatic image switching mode).

Figure 4:
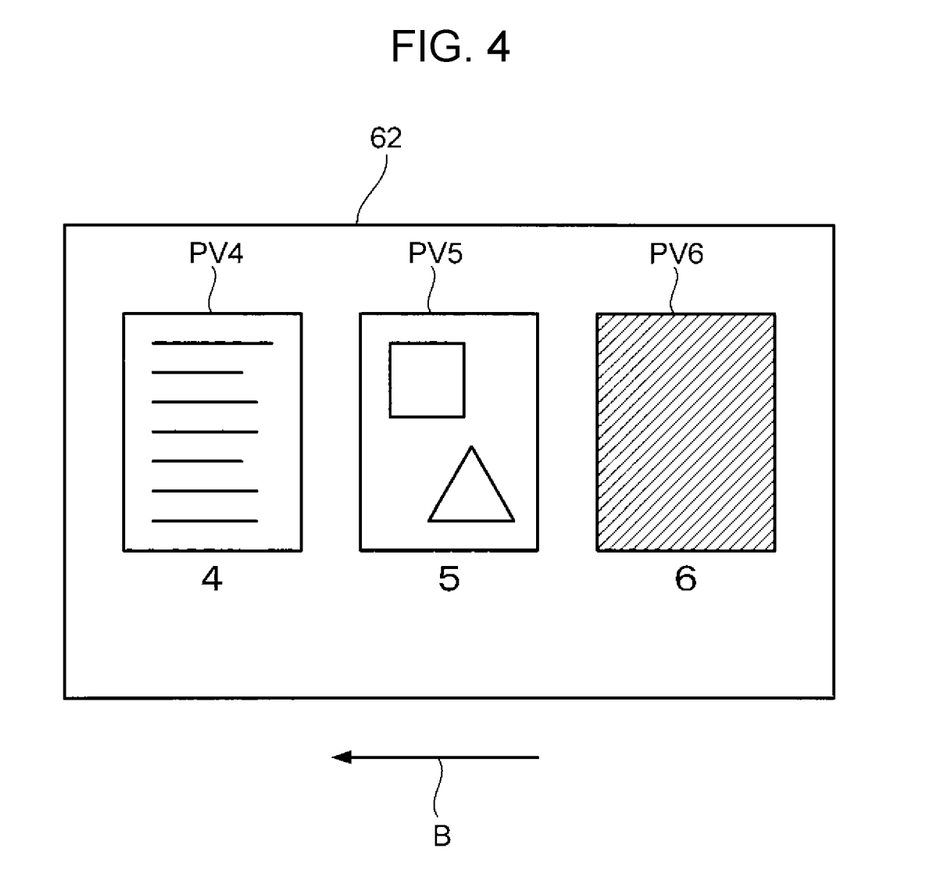
FIG. 4 illustrates an example of a screen presented on a display.

FIG. 4 illustrates an example of the automatic scrolling. As illustrated in FIG. 4, preview images from page 1 through page 5 are generated. A preview image PV5 on the latest page 5 is displayed in the center of the display 62, a preview image PV4 on page 4 immediately prior to page 5 is displayed to the left side of the preview image PV5, namely, on the left portion of the display 62. A preview PV6 on page 6 that has not yet been generated is grayed out to the right of the preview PV5, namely, on the right portion of the display 62. When the preview image is generated as the original document reading is in progress, the preview image moves in a direction labeled an arrow mark B in FIG. 4. More specifically, the preview image PV4 on page 4 disappears from the display 62, and the preview image PV5 on page 5 moves to and is displayed on the left portion of the display 62. The preview image PV6 on page 6 moves to and is displayed on the center portion of the display 62. The preview image on page 7 that has not yet been generated is still grayed out on the right portion of the display 62.

Figure 5:
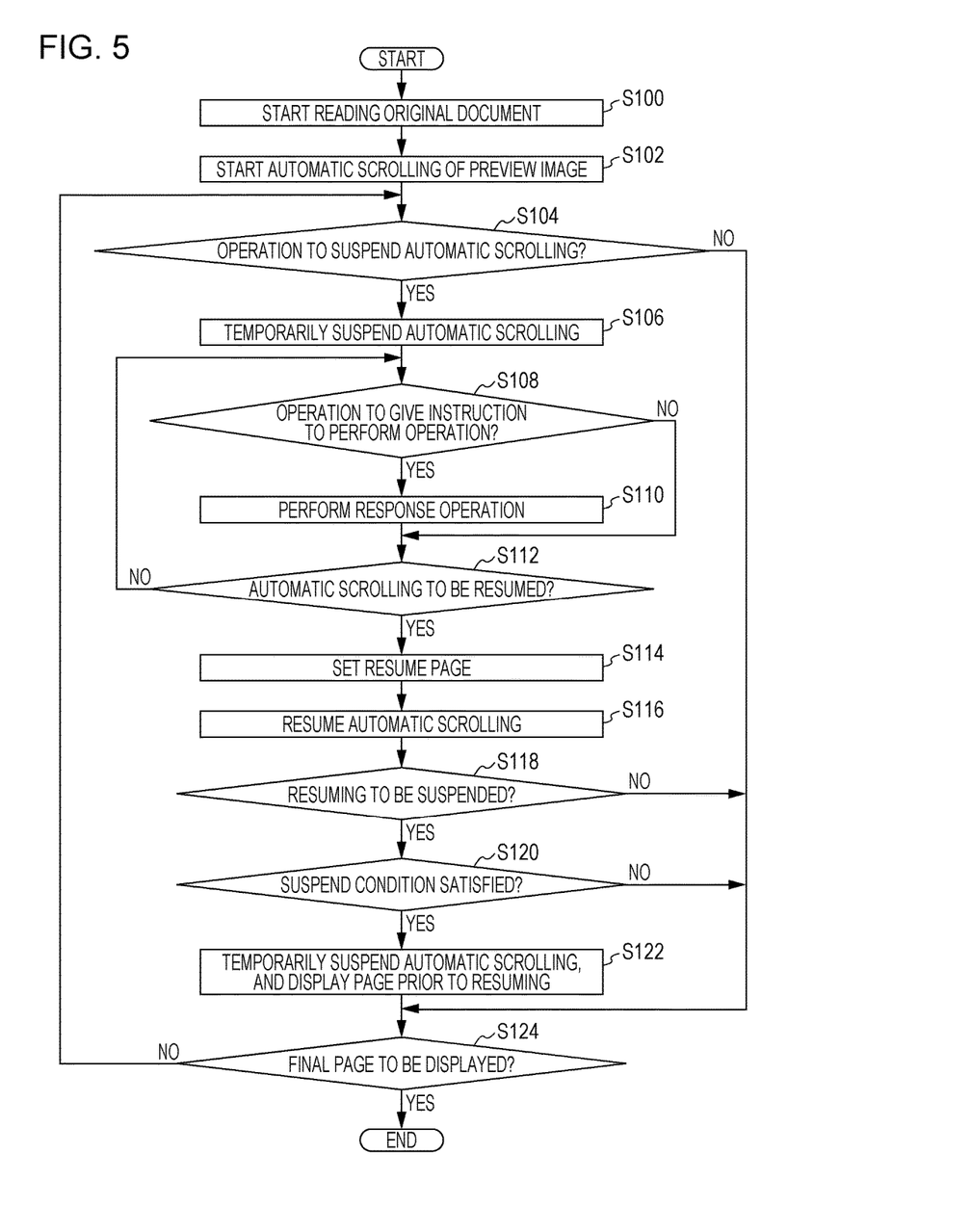
FIG. 5 is a flowchart illustrating a display control process for automatic scrolling.

A display control process for automatic scrolling to be executed by the CPU 50A is described below as an operation of the exemplary embodiment with reference to a flowchart of FIG. 5. The display control process of FIG. 5 is performed when a user sets an original document on the original document tray 20 and an instruction to read the original document is provided.

In step S100, the CPU 50A instructs the image reading unit 10 to read an original document. The image reading unit 10 thus starts reading the original document.

In step S102, the CPU 50A starts automatic scrolling of the preview images. More specifically, the original images read by the image reading unit 10 are successively acquired, and the preview images of the acquired images are generated and successively displayed on the display 62 for automatic scrolling. The automatic scrolling is performed in parallel with the display control process of FIG. 5.

In step S104, the CPU 50A determines whether a suspend operation to suspend the automatic scrolling has been performed. To suspend the automatic scrolling, the user taps (press once) the preview image displayed on the display 62 or presses a suspend button on the operation unit 60 or a suspend button on the display 62.

If the operation to suspend the automatic scrolling has been provided, the CPU 50A proceeds to step S106. If the operation to suspend the automatic scrolling has not been provided, the CPU 50A proceeds to step S124.

In step S106, the automatic scrolling is temporarily suspended. In this way, the latest preview image, out of the preview images that are generated before the suspend operation, is displayed in the center of the display 62. Even if the automatic scrolling is temporarily suspended, the image reading unit 10 does not stop reading the original document.

In step S108, the CPU 50A determines whether an operation to instruct a process to be performed on the preview image displayed on the display 62 has been received. If the operation to instruct the process to be performed has been received, the CPU 50A proceeds to step S110. If the operation to instruct the process to be performed has not been received, the CPU 50A proceeds to step S112.

Figure 6:
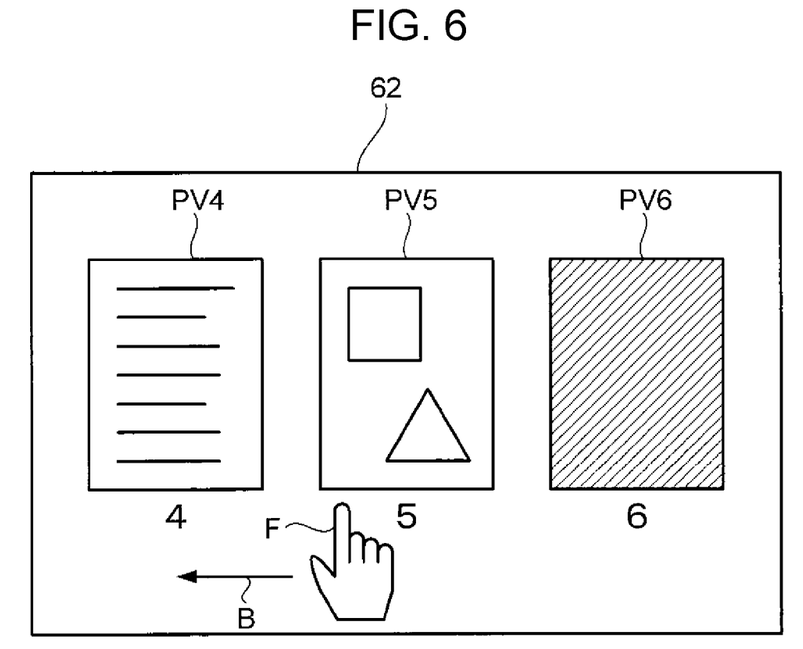
FIG. 6 illustrates an example of a screen presented on the display.
Figure 7:
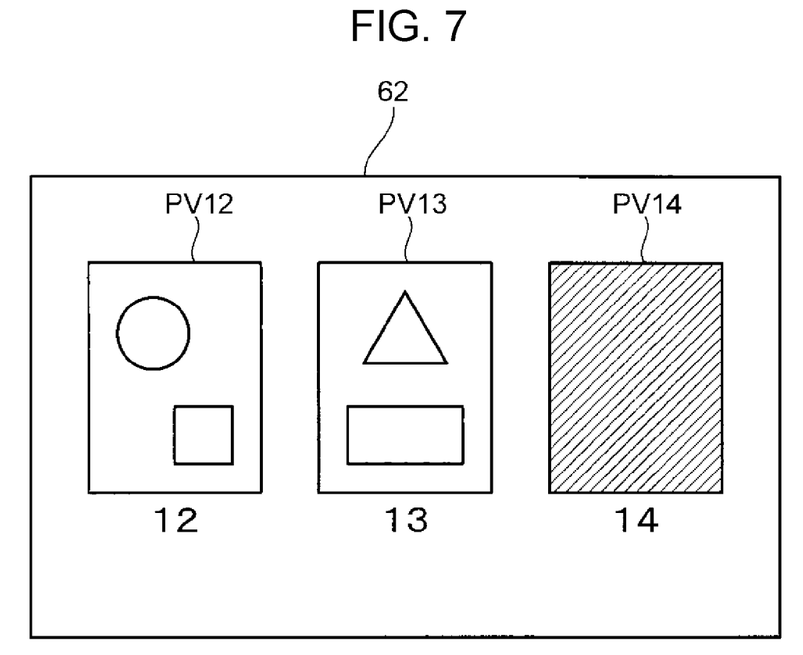
FIG. 7 illustrates an example of a screen presented on the display.

In step S110, the CPU 50A performs the process responsive to the operation. For example, if the received operation is an operation to instruct a manual scrolling operation to be performed on the preview images (manual switching operation), the CPU 50A causes the preview images displayed on the display 62 to be scrolled in response to the operation. If the user makes a flick action in a direction indicated by an arrow mark B by touching the display 62 with his or her index finger F or a swipe action by sliding his or her finger tip on the display 62 as illustrated in FIG. 6, the preview images are scrolled in the direction of the arrow mark B. In this way, the preview images displayed on the display 62 page-advances as illustrated in FIG. 7. If the flick action or the swipe action is performed in a direction opposite to the direction of the arrow mark B, the preview images are scrolled in the direction opposite to the direction of the arrow mark B. In this way, the preview images displayed on the display 62 are scrolled backward.

Figure 8:
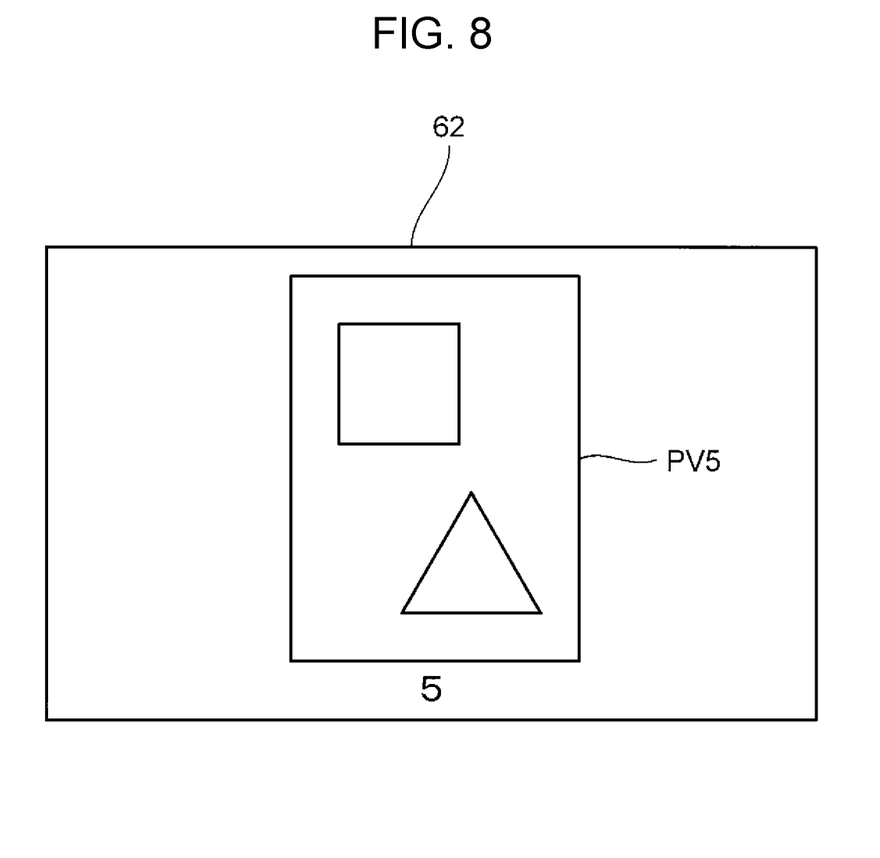
FIG. 8 illustrates an example of a screen presented on the display.

If the received instruction is to perform image processing to display the preview image in enlargement, the target preview image is displayed in enlargement. For example, if a pinchout action (to increase the space between two fingers) is taken with the thumb and the index finger placed on the preview image PV5 in the state of FIG. 6, the preview image PV5 is displayed in enlargement as illustrated in FIG. 8. If a pinchin action (to decrease the space between two fingers) is taken with the thumb and the index finger placed on the preview image PV5 in the state of FIG. 8, the display of FIG. 6 appears again.

In step S112, the CPU 50A determines whether a predetermined resume condition to resume the automatic scrolling is satisfied or not. For example, the resume condition may be a criterion as to whether a predetermined time period has elapsed since the user performed a predetermined operation last. The predetermined operation may be a flick action to press the display 62 at a slightly stronger force than a force with which the user performs manual scrolling in a direction of the automatic scrolling, a flick action after long pressing, or pressing a dedicated resume button by the user.

If the resume condition is satisfied, processing proceeds to step S114. If the resume condition is not satisfied, processing returns to step S108.

In step S114, a resume page where the automatic scrolling resumes is set. More specifically, the image of the latest original document currently being read by the image reading unit 10 is set to be a resume page. For example, if the preview image currently displayed in the center of the display 62 is the preview image PV5 on page 5 as illustrated in FIG. 6, and the latest original document currently read by the image reading unit 10 is on page 13, the resume page is page 13. When the automatic scrolling resumes in next step S116, the automatic scrolling starts with a preview image PV13 on page 13 displayed in the center of the display 62 as illustrated in FIG. 7.

Alternatively, the preview image currently displayed on the display 62 or the preview image on the next page may be set to be a resume page. For example, if the preview image currently displayed in the center of the display 62 is the preview image PV5 on page 5 as illustrated in FIG. 6, the resume page may be page 5 or page 6. When the automatic scrolling resumes in step S116, the automatic scrolling starts with the preview image PV5 on page 5 or the preview image PV6 on page 6 displayed in the center of the display 62.

In step S116, the automatic scrolling resumes with the resume page set in step S114. In such a case, the automatic scrolling may be started after quickly scrolling the preview images to the resume page.

The image switching rate of the preview images (a display time period per preview image) after the automatic scrolling is resumed may be set to be higher than a reading rate of the original document by the image reading unit 10 (a reading time period per original document page).

The image switching rate of the preview images after the automatic scrolling is resumed may be set depending on a difference in the number of pages between the resume page set in S114 and the preview image page displayed on the display 62 immediately prior to the suspending of the automatic scrolling. For example, as the difference in the number of pages increases, the image switching rate is set to be higher, and as the difference in the number of pages decreases, the image switching rate is set to be lower.

In this way, a difference between the advance speed of the original document reading and the display advance speed of the preview images becomes smaller.

When the automatic scrolling resumes, the display image on the display 62 skips, from the preview image on the page subsequent to the preview image displayed on the display 62 immediately prior to the resuming of the automatic scrolling, to the preview image immediately prior to the resume page set in S114. Identification information to identify the preview image that is skipped in the resumed automatic scrolling and is not displayed may be attached to the preview image. The automatic scrolling may be suspended and followed by the manual scrolling, and then the automatic scrolling may resume. In order to display a preview image that is not displayed in the resumed automatic scrolling, an identification mark may be displayed for that preview image. In this way, the preview image that is not displayed in the resumed automatic scrolling is thus recognized.

In step S118, the CPU 50A determines whether a suspend operation to suspend the resumed automatic scrolling has been made. If the suspend operation has been performed, the CPU 50A proceeds to step S120. If the suspend operation has not been performed, the CPU 50A proceeds to step S124.

In step S120, the CPU 50A determines whether a suspend condition to suspend the resumed automatic scrolling is satisfied. The suspend condition may be a criterion as to whether an elapsed time from the resuming of the automatic scrolling is within a predetermined time period, or whether the number of preview images displayed on the display 62 from the resuming of the automatic scrolling falls within the range of a predetermined number.

If the suspend condition is satisfied, the CPU 50A proceeds to step S122. If the suspend condition is not satisfied, the CPU 50A proceeds to step S124.

In step S122, the CPU 50A suspends the automatic scrolling, and causes the display 62 to display the preview image on the page displayed on the display 62 immediately prior to the resuming of the automatic scrolling. Even if the user erroneously resumes the automatic scrolling, the suspend operation may be performed. If the suspend condition is satisfied, the CPU 50A returns back to the state immediately prior to the resuming of the automatic scrolling.

In step S124, the CPU 50A determines whether the preview image on the last page of the read original document is displayed on the display 62. More specifically, the CPU 50A determines whether the automatic scrolling has reached the last page. If the automatic scrolling has reached the last page, this routine is complete. If the automatic scrolling has not yet reached the last page, the CPU 50A returns to step S104 to repeat step S104 and subsequent steps.

In accordance with the exemplary embodiment, even if the suspend instruction to suspend the automatic scrolling of the images read by the image reading unit 10 is provided, the image reading unit 10 does not stop the image reading while the automatic scrolling suspended. This controls a decrease in the image reading efficiency. A suspend button for the user to expressly instruct the automatic scrolling to be temporarily suspended is not used. More specifically, the temporary suspending of the automatic scrolling is intended to mean that if a temporary suspend instruction to suspend the automatic scrolling is provided by any kind of command, the automatic scrolling is suspended, and is then resumed.

In accordance with the exemplary embodiment, the image reading unit 10 reads the images of the original document. The present invention is applicable to the case in which images, such as photographs, are downloaded from a server, and the preview images of the downloaded images are successively displayed on the display.

In accordance with the exemplary embodiment, the image forming apparatus includes the image forming unit of the electrophotographic system. The present invention is applicable to the image forming apparatus of the ink-jet system.

In accordance with the exemplary embodiment, the display control program of the automatic scrolling is pre-installed on the hard disk 90. The present invention is not limited to this arrangement. For example, the display control program may be provided in a recorded form on a memory medium, such as a compact disk read-only memory (CD-ROM), or may be provided via a network.

The configuration of the image forming apparatus 11 described with reference to the exemplary embodiment (see FIG. 1 through FIG. 3) has been described for exemplary purposes only. Some elements may be deleted from the configuration or new elements may be added to the configuration as long as the configuration with such a modification falls within the scope of the present invention.

The process of the display control program described with reference to the exemplary embodiment (see FIG. 5) has also been described for exemplary purposes. Some steps may be deleted or new steps may be added or the order of steps may be changed as long as the process with such a modification falls within the scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
an acquisition unit that successively acquires a plurality of images; and
a processor configured to:
display the images on a display in an automatic image switching mode by successively switching from one to another the images acquired by the acquisition unit;
temporarily suspend the automatic image switching mode without the acquisition unit stopping acquiring the images if an instruction to suspend the automatic image switching mode is provided; and
resume the automatic image switching mode that has been temporarily suspended,
wherein the processor resumes the automatic image switching mode starting with a latest image acquired by the acquisition unit, the latest image being acquired after the suspension of the automatic image switching mode and being separated by at least one image from the image displayed by the display when the automatic image switching mode is suspended.

2. The display control apparatus according to claim 1,
wherein the acquisition unit successively acquires images of a plurality of original documents, and
wherein the processor resumes the automatic image switching mode if a predetermined resume condition is satisfied.

3. The display control apparatus according to claim 1, wherein:
the processor accepts an instruction to perform image processing on an image displayed on the display if the automatic image switching mode is temporarily suspended; and
the processor performs the image processing on the image displayed on the display in response to the received instruction.

4. The display control apparatus according to claim 2, wherein:
the processor accepts an instruction to perform image processing on an image displayed on the display if the automatic image switching mode is temporarily suspended; and
the processor performs the image processing on the image displayed on the display in response to the received instruction.

5. The display control apparatus according to claim 1, wherein the processor identifies an image not displayed on the display if the automatic image switching mode is resumed.

6. The display control apparatus according to claim 2, wherein the processor identifies an image not displayed on the display if the automatic image switching mode is resumed.

7. The display control apparatus according to claim 3, wherein the processor identifies an image not displayed on the display if the automatic image switching mode is resumed.

8. The display control apparatus according to claim 4, wherein the processor identifies an image not displayed on the display if the automatic image switching mode is resumed.

9. The display control apparatus according to claim 1, wherein if a manual switching operation to manually switch between the images displayed on the display is performed with the automatic image switching mode suspended, the processor performs a manual image switching mode to manually switch between the images displayed on the display in response to the manual switching operation, and wherein the processor resumes the automatic image switching mode starting with the image displayed on the display or an image to be displayed next on the display if the automatic image switching mode is resumed.

10. The display control apparatus according to claim 2, wherein if a manual switching operation to manually switch between the images displayed on the display is performed with the automatic image switching mode suspended, the processor performs a manual image switching mode to manually switch between the images displayed on the display in response to the manual switching operation, and wherein the processor resumes the automatic image switching mode starting with the image displayed on the display or an image to be displayed next on the display if the automatic image switching mode is resumed.

11. The display control apparatus according to claim 1, wherein the processor sets a switching rate of displayed images after the automatic image switching mode is resumed to be higher than a switching rate of displayed images before the automatic image switching mode is temporarily suspended.

12. The display control apparatus according to claim 2, wherein the processor sets a switching rate of displayed images after the automatic image switching mode is resumed to be higher than a switching rate of displayed images before the automatic image switching mode is temporarily suspended.

13. The display control apparatus according to claim 1, wherein if a suspend operation to suspend the automatic image switching mode is performed after the automatic image switching mode is resumed, the processor suspends the automatic image switching mode and causes the display to display an image that is displayed immediately before the automatic image switching mode is resumed.

14. The display control apparatus according to claim 13, wherein the processor accepts the suspend operation if a predetermined suspend condition is satisfied after the automatic image switching mode is resumed.

15. The display control apparatus according to claim 1, wherein the latest image includes an identification mark to identify the at least one image separating the latest image and the image displayed by the display when the automatic image switching mode is suspended.

16. The display control apparatus according to claim 1, wherein the acquisition unit acquires the plurality of images by reading a plurality of original documents.

17. A display control method comprising:
successively acquiring a plurality of images; and
by a processor:
displaying the acquired images on a display in an automatic image switching mode by successively switching the acquired images from one to another;
temporarily suspending the automatic image switching mode without stopping acquiring the images if an instruction to suspend the automatic image switching mode is provided; and
resuming the automatic image switching mode that has been temporarily suspended,
wherein the automatic image switching mode is resumed starting with a latest image acquired, the latest image being acquired after the suspension of the automatic image switching mode and being separated by at least one image from the image displayed by the display when the automatic image switching mode is suspended.

18. A non-transitory computer readable medium storing a program causing a computer to execute a process for controlling displaying, the process comprising:
successively acquiring a plurality of images;
displaying the acquired images on a display in an automatic image switching mode by successively switching the acquired images from one to another;
temporarily suspending the automatic image switching mode without stopping acquiring the images if an instruction to suspend the automatic image switching mode is provided; and
resuming the automatic image switching mode that has been temporarily suspended,
wherein the automatic image switching mode is resumed starting with a latest image acquired, the latest image being acquired after the suspension of the automatic image switching mode and being separated by at least one image from the image displayed by the display when the automatic image switching mode is suspended.

* * * * *